US011918908B2

(12) United States Patent
Nay (10) Patent No.: US 11,918,908 B2
(45) Date of Patent: Mar. 5, 2024

(54) OVERLAYING CONTENT WITHIN LIVE STREAMING VIDEO

(71) Applicant: GumGum, Inc., Santa Monica, CA (US)

(72) Inventor: Maxime Nay, Santa Monica, CA (US)

(73) Assignee: GumGum, Inc., Santa Monica, CA (US)

( * ) Notice: Subject to any disclaimer, the term of this patent is extended or adjusted under 35 U.S.C. 154(b) by 0 days.

(21) Appl. No.: 18/050,006

(22) Filed: Oct. 26, 2022

(65) Prior Publication Data

US 2023/0311000 A1 Oct. 5, 2023

Related U.S. Application Data

(63) Continuation of application No. 17/129,494, filed on Dec. 21, 2020, now Pat. No. 11,484,795, which is a continuation of application No. 16/592,600, filed on Oct. 3, 2019, now Pat. No. 10,898,809.

(60) Provisional application No. 62/741,316, filed on Oct. 4, 2018.

(51) Int. Cl.
| | |
|---|---|
| *A63F 13/61* | (2014.01) |
| *A63F 13/30* | (2014.01) |
| *A63F 13/52* | (2014.01) |
| *H04N 21/2187* | (2011.01) |
| *H04N 21/234* | (2011.01) |
| *H04N 21/81* | (2011.01) |
| *A63F 13/537* | (2014.01) |

(52) U.S. Cl.
CPC .............. *A63F 13/61* (2014.09); *A63F 13/30* (2014.09); *A63F 13/52* (2014.09); *H04N 21/2187* (2013.01); *H04N 21/23424* (2013.01); *H04N 21/812* (2013.01); *A63F 13/537* (2014.09); *A63F 2300/303* (2013.01); *A63F 2300/5506* (2013.01)

(58) Field of Classification Search
CPC ...... A63F 13/12; A63F 13/253; A63F 13/327; A63F 13/33; A63F 13/332; A63F 13/335; A63F 13/50; A63F 13/52; A63F 13/53; A63F 13/61; H04L 29/06034; H04N 21/25435; H04N 21/812
See application file for complete search history.

(56) References Cited

U.S. PATENT DOCUMENTS

| | | |
|---|---|---|
| 8,391,773 B2 | 3/2013 | Arseneau et al. |
| 10,898,809 B2 | 1/2021 | Nay |

(Continued)

OTHER PUBLICATIONS

PCT Search Report and Written Opinion—PCT/US2019/054569 dated Jan. 24, 2020.

*Primary Examiner* — Omkar A Deodhar
(74) *Attorney, Agent, or Firm* — Knobbe, Martens, Olson & Bear, LLP (57) ABSTRACT

Systems and methods are provided for integrating supplemental overlay content within streaming video content that is to be broadcast to viewer devices. The overlay content to include in the streaming video content may be dynamically determined during video streaming and incorporated within individual frames of the video data, such as by a computing device of a user who is broadcasting his play of a video game or other activity, prior to the user's computing device sending those video frames (with embedded overlay content therein) to a streaming platform to be broadcast to potentially many viewers' devices.

20 Claims, 7 Drawing Sheets

(56) References Cited

U.S. PATENT DOCUMENTS 11,484,795 B2 11/2022 Nay
2012/0309511 A1 12/2012 Chung et al.

OVERLAYING CONTENT WITHIN LIVE STREAMING VIDEO

PRIORITY CLAIM

This application is a continuation of U.S. patent application Ser. No. 17/129,494 filed Dec. 21, 2020 titled "OVERLAYING CONTENT WITHIN LIVE STREAMING VIDEO", which is a continuation of U.S. patent application Ser. No. 16/592,600, filed Oct. 3, 2019, titled "OVERLAYING CONTENT WITHIN LIVE STREAMING VIDEO," which claims the benefit of priority under 35 U.S.C. § 119(e) of U.S. Provisional Application No. 62/741,316, filed Oct. 4, 2018, and entitled "OVERLAYING CONTENT WITHIN LIVE STREAMING VIDEO," the entire contents of which are each hereby incorporated by reference in their entirety herein and should be considered a part of this specification.

BACKGROUND

A live stream (and the associated act of live streaming) may refer to video and accompanying audio that is broadcast over the Internet to viewers' computing devices in real time or near-real time as it is recorded or initially captured. Live streaming of video games and computer games has become increasingly popular. In video game streaming, a person (sometimes referred to as a streamer) typically plays a video game while also speaking commentary to a microphone or camera, and the combined video production is uploaded in real time to a network-based streaming platform. Other individuals may access the streaming platform (such as by accessing a channel or webpage on the platform associated with the individual streamer) in order to view a live or slightly delayed (e.g., a delay of less than 30 seconds typically) presentation of the streaming gameplay and commentary. Live streaming is also popular outside of the gaming context, such as when a streamer may stream live video of himself talking to a camera, and/or stream live video of his surroundings or a real world event.

A streamer may interact with viewers during the live stream, such as by verbally responding to text comments that viewers submit through the streaming platform. A streamer may generate revenue from his or her live streams, typically from the streaming platform offering individual viewers the ability to provide monetary donations or sign up for paid subscriptions. For example, a streaming platform via which viewers view a given live stream may enable individual viewers of the stream to pay for special access or additional features. Additionally, some streaming platforms pay a streamer for allowing the streaming platform to display advertisements to viewers of a stream.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to advertisement or other supplemental overlay content that is displayed over or within a video stream. The overlay content to include in the streaming video content may be dynamically determined during video streaming and incorporated within individual frames of the video data on a streamer's computing device prior to the streamer's computing device sending those video frames (with embedded overlay content therein) to a streaming platform to be broadcast to potentially many viewers' devices. In some embodiments, the particular advertisement content or other supplemental overlay content added within gameplay video or other captured video content, as well as the manner in which it is incorporated, may be determined based on a variety of factors. These factors may include, for example, an automated analysis of the gameplay video, data regarding the game being played, data regarding the streamer or player of the game, real time viewership data from a streaming platform, a real time auction of advertisement inventory, and/or other data and determinations discussed herein.

In some embodiments, aspects of the present disclosure may be implemented at least in part via a plug-in that integrates with a streaming application and/or video editing application. For example, in one embodiment, a plug-in providing streaming advertisement features may be provided to users of a desktop streaming application who wish to incorporate client-side advertisement insertion within their outgoing gameplay streams produced via the desktop streaming application. Such a plug-in may be developed by a different developer than the developer of the streaming application, and may be developed specifically to integrate with one or more streaming applications or streaming platforms. Some developers may refer to plug-ins configured for their applications using alternative terms, such as widgets, or may accomplish similar functionality via use of an application programming interface (API) that may be accessed by third-party developers or platforms. In other embodiments, advertisement overlay features described herein may be integrated within a streaming application and/or video editing application by the developer of the streaming application or video editing application, such that no additional installation is needed from the user's perspective to access the advertisement overlay features with the application.

Providing advertisement content from an advertisement server or network-based service to a client device for insertion into content that is being live streamed to other systems via a third-party streaming platform is an unconventional system arrangement, and many of the features described herein are unique to such an arrangement. One difference from traditional Internet advertisement system arrangements in which an advertisement service selects and sends advertisement content to a user's device for display is that such an advertisement would typically be intended for display to that individual user as opposed to being intended for display to some wider downstream audience. Another difference on the side of the advertisement server or service from existing approaches for selecting an advertisement to insert within streaming video content, such as in the case of advertisement insertion within a video on a video sharing platform, is that features described herein consider viewer data other than information about the specific user whose device the advertisement will be sent to once selected by the server. For example, aspects of the present disclosure additionally consider, during advertisement selection at a server or network-based advertisement service, live viewership data regarding downstream viewers of the streaming broadcast. This viewership data may be received from a different system (e.g., by the advertisement service from a network-accessible streaming platform) than the user's device that will receive the selected advertisement package from the advertisement service for incorporation in frames of the video stream to then be uploaded from the user's device to the streaming platform for wider downstream distribution.

Aspects of the present disclosure additionally provide a number of technical distinctions and improvements on the client side (e.g., at the streamer's computing device) relative to traditional approaches to incorporating advertisement content with video. For example, integrating advertisement content within streaming video content on the client side at the streamer's system (rather than, for example, advertisement insertion being performed by the streaming platform or within the game itself) is an unconventional system arrangement and network location at which to perform advertisement insertion in association with video game streaming. Advantages relative to advertisement placement occurring at the streaming platform include that the streamer client-side implementation disclosed herein enables advertisement insertion to occur the same way for distribution to any streaming platform without any separate configuration needed on the streaming platform side.

For example, according to aspects of the present disclosure in some embodiments, there is no need for a specific streaming platform to be configured to work with a specific plug-in or API, or for a streaming user to separately set up advertisement settings among different streaming platforms used by the user. Furthermore, according to aspects of the present disclosure, there is no need for each individual streaming platform used by the streaming user to be configured to integrate advertisements from an advertisement network that the streaming user prefers or some other source preferred by the streaming user (such as an advertiser that sponsors the stream, but has no relation or association with any streaming platform).

While aspects of the present disclosure include inserting advertisement content or other video overlay content in a manner whereby the advertisement content appears to actually be a part of a three-dimensional (3D) rendered game environment, the approaches herein are much different than those that a video game developer employs to include advertisement content within the developer's game. For example, existing video games, particularly sports games, will often include advertisement content within the game's virtual world (e.g., a basketball video game may include advertisements for real companies that appear on virtual stanchions within a rendered arena within the video game). However, traditional approaches for rendering that advertisement content involve rendering advertisements at the same time as the rest of the 3D game environment by code of the game itself. For example, code of the game may apply an advertisement image (such as a company logo) as a texture on a 3D object within the 3D game environment prior to the game environment as a whole being rendered for initial display to the game player. In contrast, aspects of the present disclosure relate to the more technically difficult problem of rendering and inserting an advertisement to appear as part of a 3D video game scene after the scene has been rendered for display by the game as two-dimensional video output, and without access to the actual 3D object data or environment data that was used by the game to render the two-dimensional output.

Aspects of the present disclosure provide additional benefits in situations where a streamer is a part of an eSports team or otherwise associated with an eSports organization or other organization that sponsors the streamer in some way. Some such organizations (such as an eSports team or organization) may sponsor, employ or otherwise have contractual relationships with a number of different professional or semi-professional video game players. Many of these players may play in competitive eSports events on behalf of their eSports team, but may separately live stream their gameplay to online audiences outside of official competitive events. Companies may have sponsorship or branding agreements with an eSports team or eSports organization that then flow down to individual players on the team. For example, an energy drink company may sponsor a particular team of video game players, and may negotiate as part of its sponsorship relationship with the team that the energy drink's branding is shown during streaming broadcasts that feature any of the team's players.

Existing systems and approaches to advertising in association with video game streaming do not provide eSports organizations (or other organizations that want to direct the advertisements appearing on a number of its members' live streams) the ability to effectively manage advertisements appearing on the various streams of its players. The organization may desire such control to ensure that team-level sponsorships or branding are properly implemented on individual streamers' videos. According to existing approaches, streamers may be told by their team to manually add in sets of logos into their streams based on the deals that sponsors have made with the team. In such approaches, when new sponsor deals are signed or old deals expire with respect to the team, the team needs to notify its individual streamers to each manually swap out the advertisement images or other assets set up in that streamer's individual streaming application for use in future streams. Many teams lack resources to design or integrate creative advertisements that incorporate well within a particular game that a streamer may play within a given live streaming session, and instead default to basic logos that often do not match well within the game's environment (e.g., create a jarring visual contrast between the game environment and the advertisement, distract from gameplay, or are otherwise not tailored in any significant way to the game or to specific occurrences within the game at a given time the advertisement is displayed).

According to the above existing manual approaches, control of the advertisement insertion itself within a stream is left to the individual streamers, which makes overall management for organizations extremely difficult and cumbersome, typically requiring someone from the organization to verify one streamer at a time by viewing the live streams of its member players and checking for proper advertisement or sponsor placement. Aspects of the present disclosure provide a management platform to assist eSports teams or other organization to manage and audit the desired sponsorship or brand placement that the team desires of its individual players' streams, while also allowing for automated improvement of the integration of the branding with specific game content during a stream.

While video games and computer games are referred to herein, the term video game is intended to have a broad meaning that may apply to a game that is played on any one of a variety of systems, such as a stand-alone console system (e.g, for display on a television), a mobile gaming device, a smartphone, a laptop computer, a desktop computer, a set-top box, and/or some other computing device. Furthermore, the types of video games that may be the subject of a live stream as discussed herein may include broad ranges of games. For example, they may include single player or multi-player games, offline games or online games (e.g., massively multiplayer online games), competitive or cooperative games, "sandbox" or open world environments without defined goals, 2D or 3D games, etc. Furthermore, while games are often used herein as an example of the underlying content being streamed by a streamer, it will be appreciated that many aspects of the present disclosure provide benefits outside of the gaming context, such as for streaming video of the real world captured by a camera to downstream viewers on a streaming platform or social network.

Figure 1A:
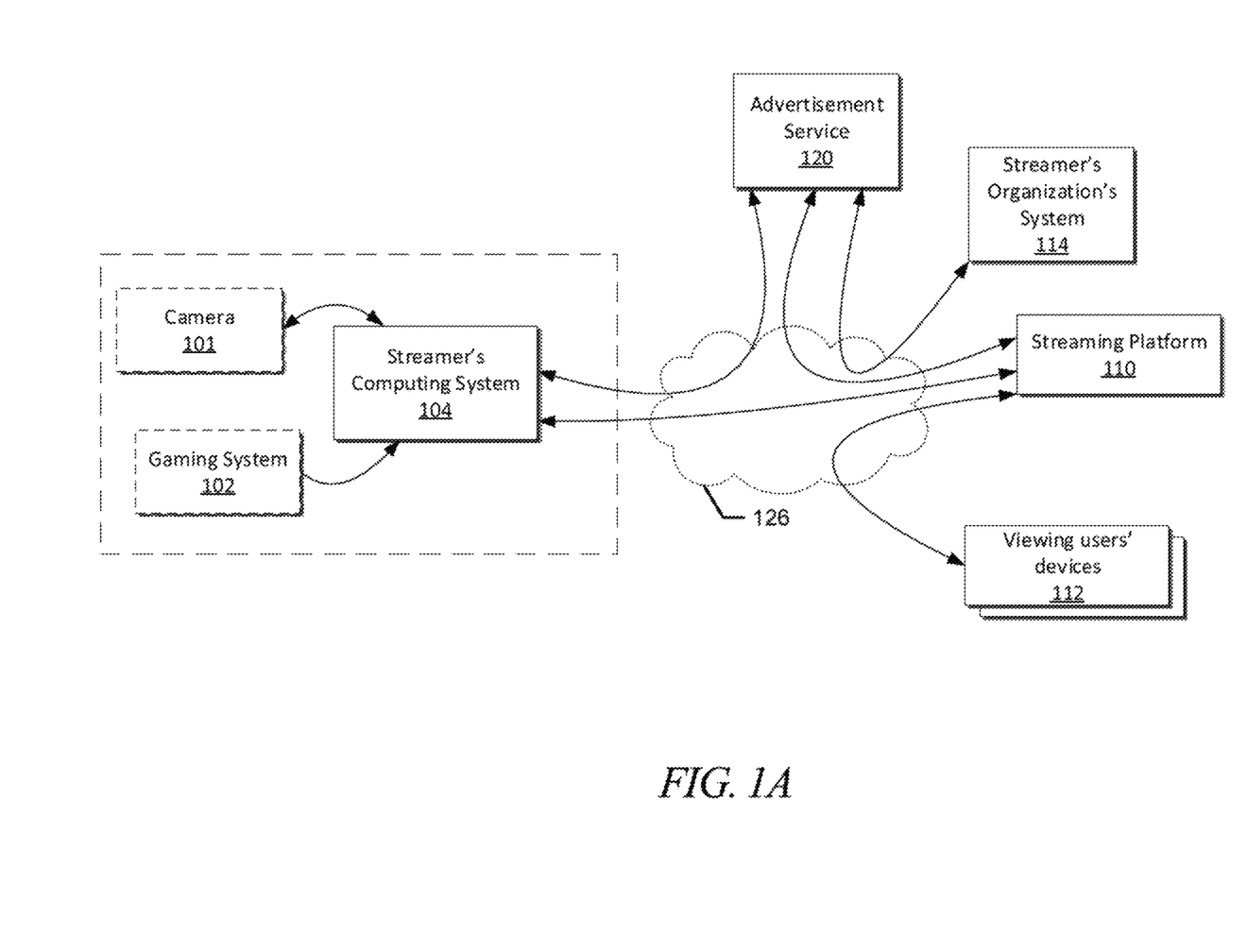
FIG. 1A is an illustrative operating environment for live streaming of gameplay with advertisement content included therein, according to some embodiments.

FIG. 1A is an illustrative operating environment for live streaming of gameplay with advertisement content included therein, according to some embodiments. The illustrative environment of FIG. 1A includes a streamer's computing system 104, which may optionally be in communication with or include a camera 101 and/or gaming system 102. The streamer's computing system 104 may in some embodiments be a separate computing system (such as a desktop or laptop computer) from the gaming system 102 (such as a second desktop or laptop computer, a mobile computing device, or a gaming console) on which the streamer plays a game that is the subject of the stream. In other embodiments, the streamer's computing system 104 may execute the game as well as a streaming application, such that no separate gaming system 102 is required. The camera 101 may be, for example, a video camera positioned to capture video of the streamer's face as he or she plays the game on the gaming system 102 or computing system 104. The camera may include a microphone, and/or a separate stand-alone microphone may be included in the streamer's streaming set up that includes the camera, gaming system and computing system that operates a streaming application.

The streamer's computing system 104 may be in communication with other systems over a network 126, such as the Internet. As illustrated, the computing system 104 may be in network communication with an advertisement service 120 and a streaming platform 110. An application or plug-in operating on the streamer's computing system 104 may cause the computing system 104 to communicate with the advertisement service 120 in order to obtain advertisement content to include in a stream. Once individual frames of the streaming content are prepared for broadcast at the streamer's computing system 104, the computing system 104 may send the resulting streaming video over the network 126 to the streaming platform 110 for real time distribution to viewing users' devices 112 (which may include desktop computers, laptop computers, mobile phones, set-top boxes, or various other systems with Internet or other network access).

In some embodiments, the streamer's computing system may additionally be in communication with the streamer's organization's system 114. In some embodiments, the streamer's organization's system 114 may be operated by a representative of an eSports team or other organization with which the operator of the streamer's computing system 104 is affiliated (such as by being a player for a certain eSports team). In other embodiments, an operator of the streamer's organization's system 114 may control advertisement settings for a given streamer via the advertisement service 120, without any direct communication between the streamer's computing system 104 and the streamer's organization's system 114.

Figure 1B:
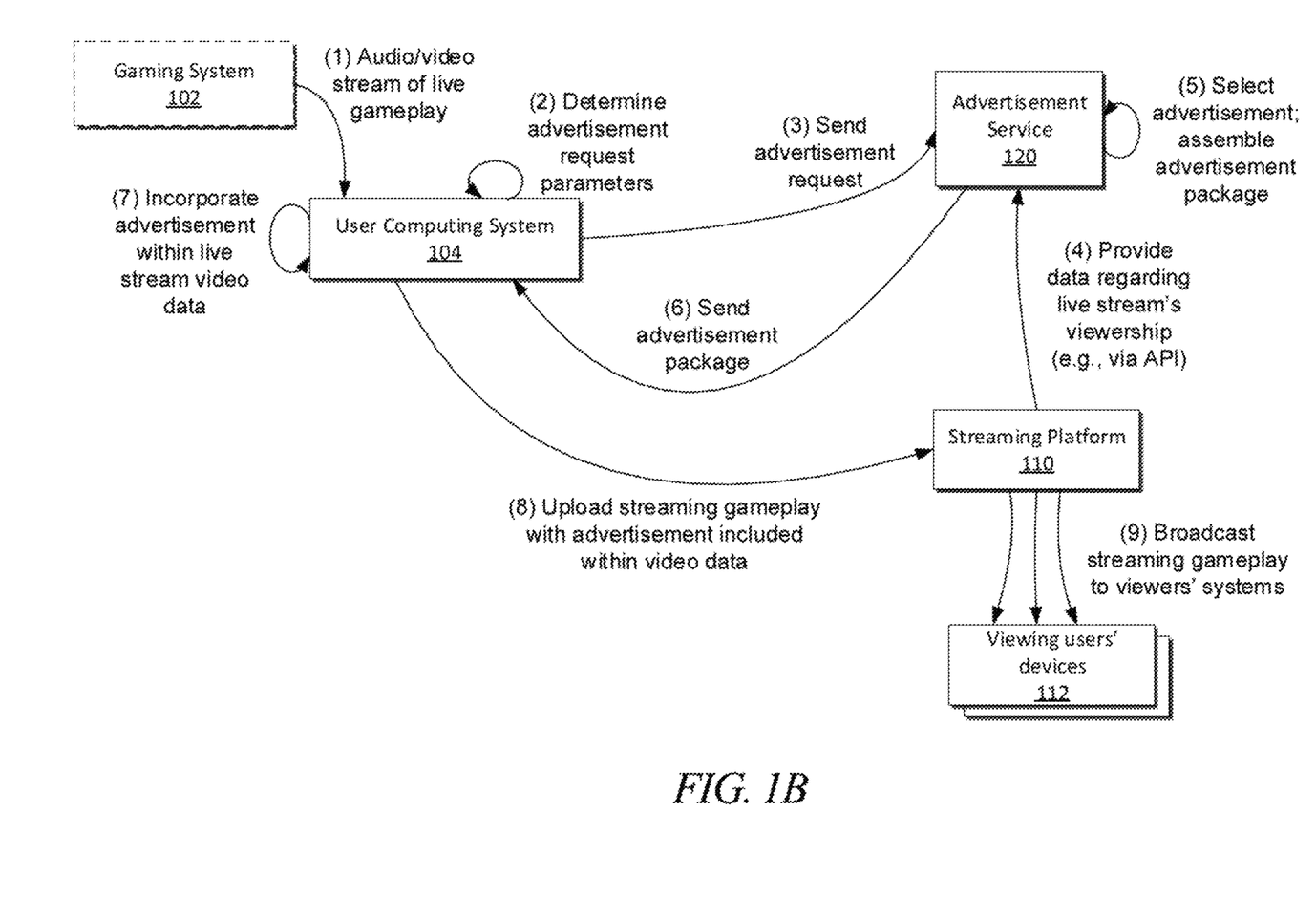
FIG. 1B provides an illustrative data flow within the environment of FIG. 1A during a live streaming broadcast.

FIG. 1B provides an illustrative data flow within the environment of FIG. 1A during a live streaming broadcast. The illustrative data flow may begin after the streamer (the user of the computing system 104) has already set up a streaming application executing on the computing system 104 to stream gameplay to streaming platform 110, and configured advertisement settings within the streaming application or an associated video editing application (which may be via a plug-in to such an application).

At (1), the computing system 104 may receive an audio and video stream of live gameplay from the gaming system 102 (such as by audio and video output of the gaming system 102 being provided as wired input to the computing system 104), as is known in the field of video game streaming. In other embodiments, the computing system 104 may itself execute the game, such as in a system that includes multiple monitors and video cards, and may execute screen capture functionality to record video of the game's visual output.

At (2), the computing system 104 may determine advertisement request parameters. For example, the computing system 104 may retrieve user preferences, user data, game data and/or advertisement settings. For example, parameters may include the game being played, a genre of the game, a unique identifier of an account of the user with the advertisement service, a unique identifier of an account of the user with one or more streaming platforms, an identifier of an eSports team or other organization associated with the user, a list of preferred or allowed sponsors, a list of blacklisted or ineligible advertisements or sponsors (e.g., competitors of a team's sponsors listed by individual company or brand category), etc. In other embodiments, some of this information may be stored in association with the user's account at the advertisement service 120, which the advertisement service 120 may retrieve based on an account identifier of the user rather than being sent from the computing system 104. The advertisement parameters may additionally include an indication of the location and/or size of a bounding region that the user has placed in a video editing interface to indicate where the user would like advertisements to appear (as discussed below with respect to FIG. 4), which may be stored as an enumerated value or placement identifier representing a relative location of a frame (e.g., "top left" or "bottom center").

Next, at (3) the computing system 104 sends an advertisement request, along with one or more advertisement parameters (such as those described above), to the advertisement service 120. Sending of the advertisement request may be triggered in a number of ways, depending on the embodiment. For example, a plug-in operating in association with a video editing application may be configured to trigger an advertisement request based on a predetermined timing (such as every two minutes, which may be configurable by the user) or in response to an explicit selection by the user (such as the streamer selecting a user interface element while streaming that causes the plug-in to insert an advertisement in the stream). In other embodiments, a plug-in or other component may dynamically trigger its advertisement insertion process based on an automated analysis of the gameplay video, as will be further discussed below. In still other embodiments, the advertisement service 120 may determine that an advertisement should be delivered to the computing system 104 for insertion into the stream without first receiving a request from the computing system 104, such as based on the advertisement service's monitoring of the stream's live viewership.

At (4), the advertisement service 120 may receive real time viewership data regarding the live stream from the streaming platform 110, such as via an API provided by the streaming platform. In some embodiments, the viewership data may be retrieved prior to a specific advertisement request being received by the advertisement service (such as on a periodic basis throughout the broadcast) in order to minimize the response time for the advertisement service to send advertisement content to the computing system 104 in response to an advertisement request. The viewership data may indicate, for example, a number of current viewers of the stream, demographic information regarding the viewers (such as total count of current viewers, largest count of concurrent viewers during the current broadcast, average age, the number of viewers in different age bands, gender percentages, general geographic locations or regions of viewers, average watch time per viewer, and/or other data). The information from the streaming platform may also indicate information about the broadcast itself, such as the game being played, although that information may have already been received by the advertisement service from the computing system 104.

The advertisement service 120 may select advertisement content at (5) and assemble an associated advertisement package for delivery to the computing device 104. In some embodiments, the selected advertisement content may have been previously associated within the advertisement service with one or more of the advertisement request's parameters. For example, the advertisement content may be content advertising a sponsor that is associated with the streamer's account with the advertisement service, or an advertisement that is specific to the game being played by the streamer. In other embodiments, the advertisement service may implement a real-time bidding or auction process to select the advertisement. For example, the various data that the advertisement service has collected from the computing system 104 and/or streaming platform 110 may be provided to a number of potential advertisers in real time that programmatically submit bids for the advertisement opportunity, with the winning bidder's advertisement content then being selected by the advertisement service. In still other embodiments, the advertisement service may select advertisement content based on selections made by the streamer's eSports team or other operator of the streamer's organization's system 114 (not illustrated in FIG. 1B). For example, the advertisement service 120 may extract the streamer's account identifier from the advertisement request, retrieve an identifier of an eSports organization associated with the streamer's account identifier in a data store, then select an advertisement based on preferences or a rule set provided by the organization.

Once the advertisement service selects an advertisement or other overlay content to be incorporated into the stream, the advertisement service may retrieve or assemble a package that includes one or more media assets (such as images, video data and/or other visual media assets), along with optional instructions or code that can be executed or interpreted at the streamer's computing system to integrate the advertisement content into the stream. In one embodiment, the package may include, for example, HTML, JavaScript, JavaScript Object Notation ("JSON"), and image assets that can be assembled by the streamer's computing system according to code in the package. In some embodiments, the package may include additional information, such as video or animation data, sound files, 3D object data and/or links to additional third-party hosted content for incorporation into an overlay content display. Overlay content packages are described further in co-pending U.S. patent application Ser. No. 15/951,762, filed Apr. 12, 2018 and entitled "MAINTAINING PAGE INTERACTION FUNCTIONALITY WITH OVERLAY CONTENT," which is hereby incorporated by reference in its entirety herein.

At (6), the advertisement service sends the advertisement package to the streamer's computing system 104. Next, at (7), the computing system 104 incorporates the advertisement content within frames of the live stream video data, as will be further discussed below. As frames of the video data have the advertisement content incorporated therein, the computing system 104 uploads the resulting video frames to the streaming platform 110 at (8) to be broadcast by the streaming platform to viewers' devices 112 at (9).

Figure 2A:
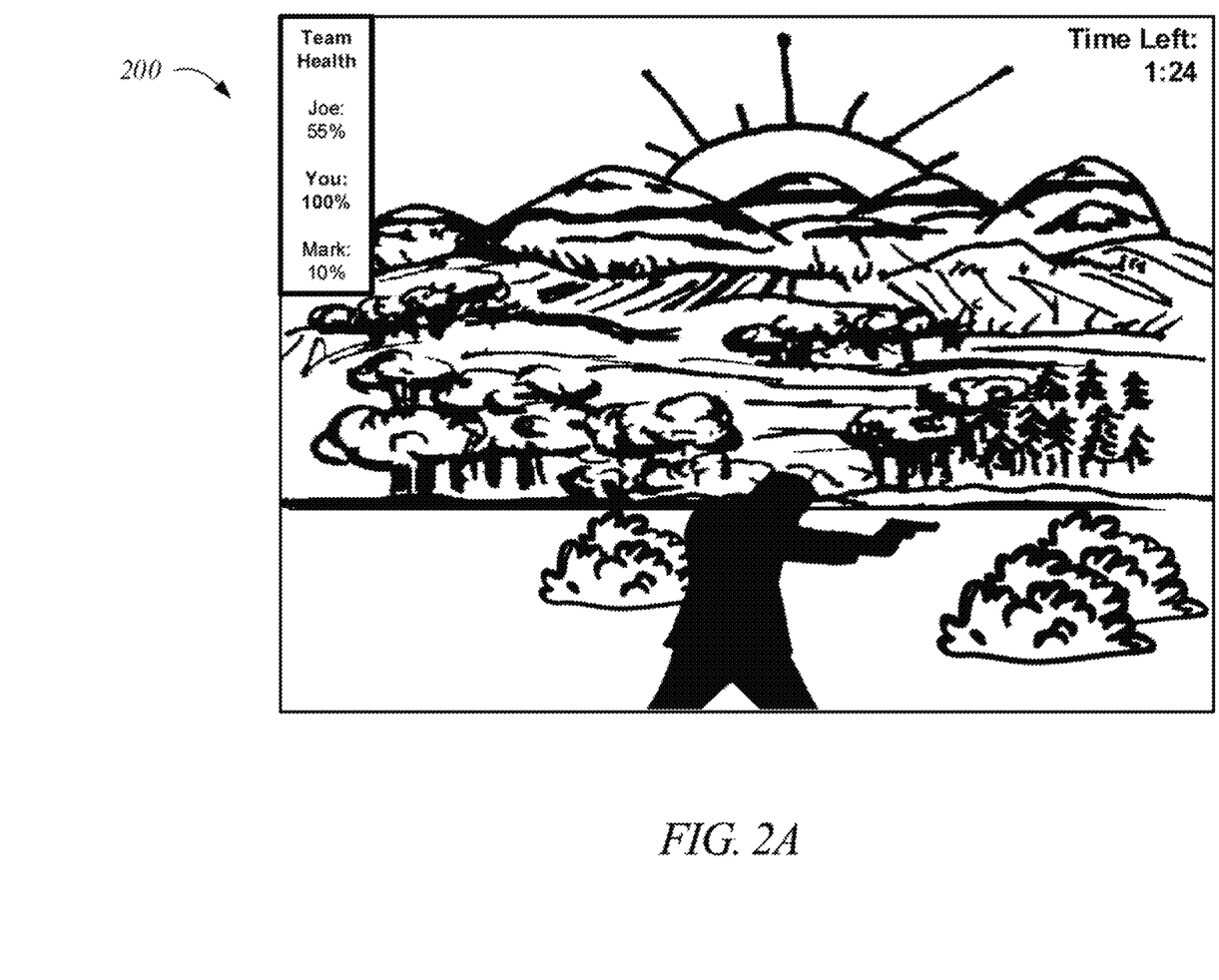
FIG. 2A is an illustrative frame of video output from a computer game prior to applying any content overlay.

FIG. 2A is an illustrative frame 200 of video output from a video game prior to applying any content overlay. As illustrated, the frame 200 depicts a character aiming a gun in a virtual environment, which may have been rendered by a game's code as two-dimensional video output based on 3D virtual environment data, as is well known in the field of video games. Apart from the rendered 3D environment and character, additional visual output of the game as illustrated includes character health information, and an indication of time remaining within the game.

As will be appreciated, the example of a frame of video from a game that includes shooting a gun in a 3D rendered environment is provided in FIG. 2A for illustrative purposes only. In other instances, the underlying game may be a 2D platform game, a sports game, or any other genre or type of game that can be played on a computing device or gaming platform. In the illustrated example, the content of frame 200 may have been generated entirely by the gaming system 102 for display on a television or computer monitor for viewing by the player of the game. The streamer's computing system 104 may receive this video output for further post-processing before uploading modified streaming video to a streaming platform.

Figure 2B:
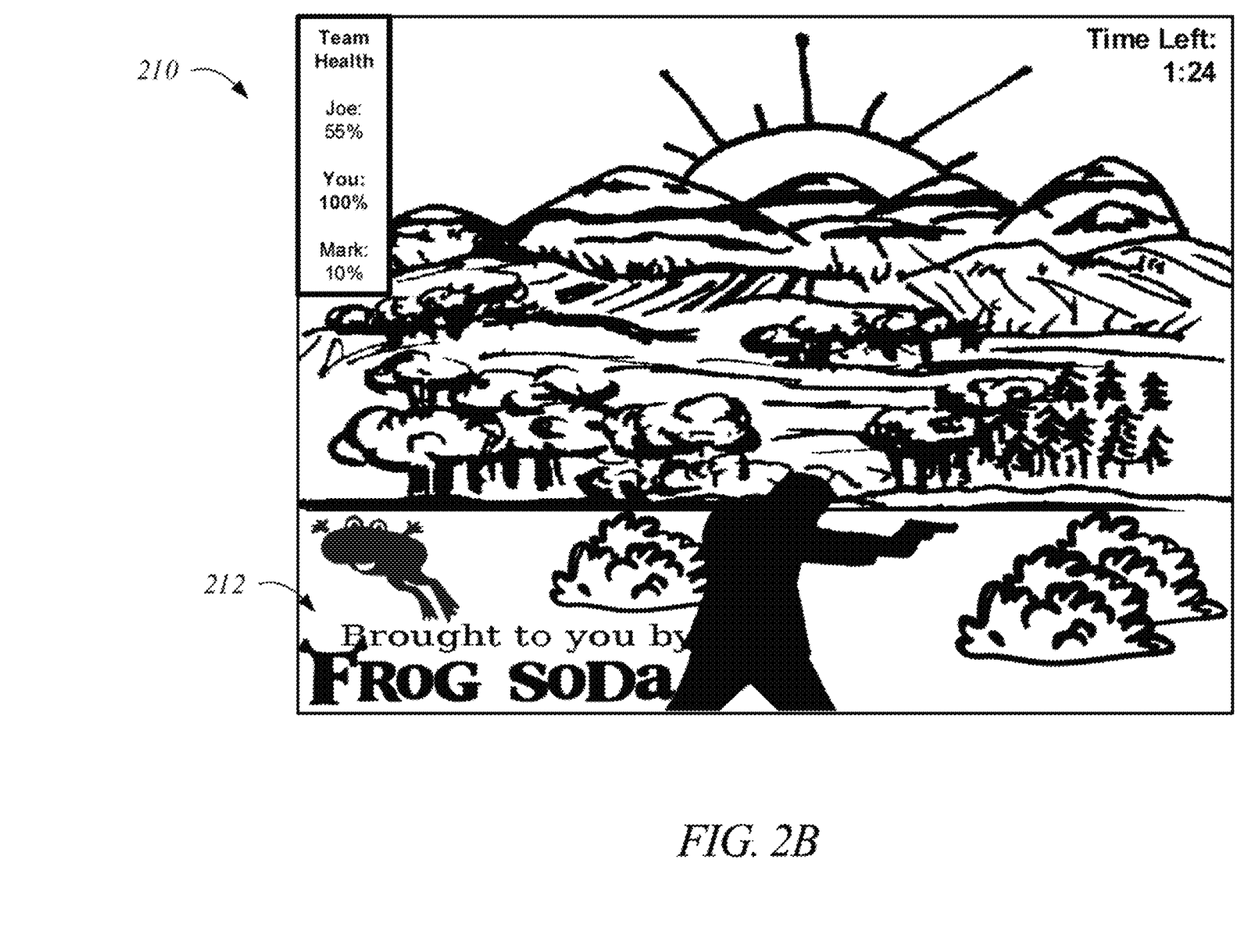
FIG. 2B is an illustrative frame of video output from a computer game with a content overlay applied to present an advertisement.

FIG. 2B is an illustrative frame 210 in which a content overlay 212 has been applied by the computing system 104 to present an advertisement within the frame 200 described above. As illustrated, the advertisement 212 is an advertisement for a product "Frog Soda," and includes a logo of the product or company. In some embodiments, the advertisement may be animated or otherwise change between successive frames, such as by the frog that appears in the advertisement jumping off screen. The advertisement may have been selected based on various data described herein, such as the game being played, viewership data associated with the streaming broadcast, an automated analysis of the scene displayed within the game, and/or advertisement settings configured by the streamer.

In some embodiments, the display of the overlay content 212 may have been triggered based at least in part by the computing system 104 employing computer vision techniques to identify a particular in-game action or occurrence. For example, a machine learning model may have been trained to detect a particular in-game action, such as a character killing an enemy in the game or a character being restored to full health, from the video output of the game. As one example, the computing system 104 may determine that a player restored his health by identifying that displayed text of "You: 100%" within the current frame 200 replaced a "You: 5%" from a prior frame. In some embodiments, an advertisement may have been previously associated with such an action (for example, Frog Soda may have indicated that it wanted to be the sponsor of health boosts within the game for a particular streamer). In other instances, machine learning models may be trained to identify certain in-game occurrences from visual information such as the pose of an in-game character, an interaction between two different in-game characters, a particular in-game object appearing, etc.

In one embodiment, the advertisement may be rendered in a manner such that it appears to be incorporated within the virtual environment of the game, such as using augmented reality (AR) techniques described in U.S. Application No. 62/619,025, filed Jan. 18, 2018 and entitled "AUGMENTING DETECTED REGIONS IN IMAGE OR VIDEO DATA," which is hereby incorporated by reference in its entirety herein. For example, as described in more detail in the above-referenced co-pending application, the computing system 104 may determine surface and pose information for a target area of the frame in which advertisement content will be placed, set up a virtual camera for real-time compositing, generate an augmentation area mask, pose the augmentation content (e.g., advertisement content) in 3D space, and output the resulting frame with layered augmentation content. The particular in-game object, space or area in which to render the advertisement content may also be determined, in some embodiments, using methods described in the above-referenced application, such as to display the advertisement on negative space (as described in that application) within the displayed virtual world of the game.

Figure 3:
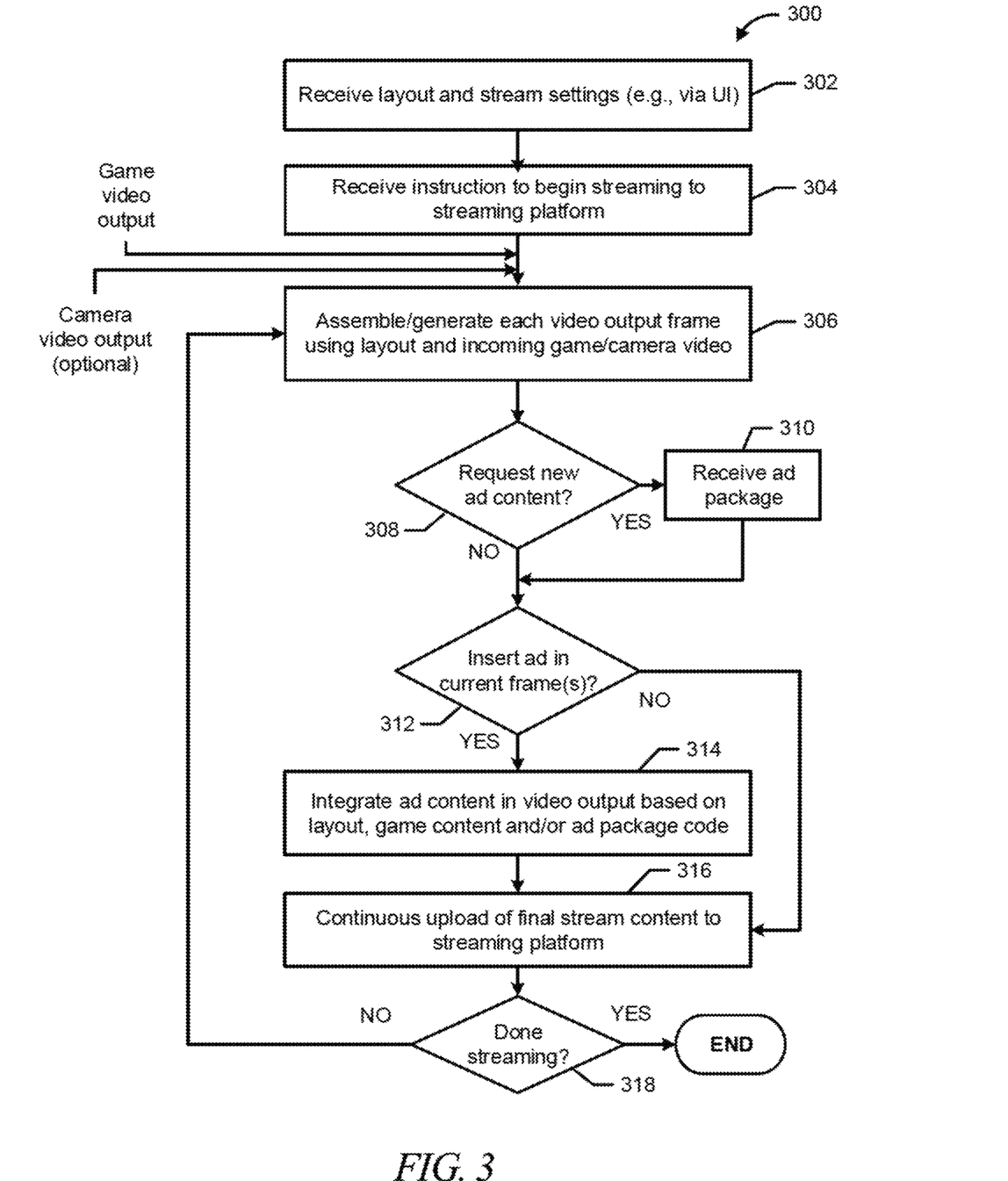
FIG. 3 is a flow diagram of an illustrative method for integrating advertisement content within frames of video content prior to uploading those frames to a streaming service or platform.

FIG. 3 is a flow diagram of an illustrative method 300 for integrating advertisement content within frames of video content prior to uploading those frames to a streaming service or platform. The illustrative method 300 may be implemented by a streamer's computing system, such as computing system 104 that will be described in more detail below. Because many blocks of method 300 have been described previously herein, some blocks are only described briefly below with respect to FIG. 3 specifically.

The illustrative method 300 begins at block 302, where the computing system 104 may receive layout and stream settings, such as from the user of computing system 104 via a user interface. For example, a user interface such as that described below with respect to FIG. 4 may enable the user to visually arrange a position of advertisement content with respect to gameplay content and/or video captured by a camera. The user may additionally provide information about the stream (e.g., the game that will be played), the console or platform the game is played on, and/or other information described above as potential advertisement request parameters.

Next, at block 304, the computing system 104 may receive an instruction from the user to begin streaming to a streaming platform, such as by the user selecting a button or other user interface element. At block 306, the computing system 104 may assemble or generate each video output frame using the user's desired layout and the incoming streaming content from the gaming system and/or video camera. For example, the computing system 104 may implement video editing application functionality to layer the different video inputs, apply visual effects, mix audio, etc. At decisional block 308, the computing system 104 may determine whether to request new advertisement content. For example, the computing system 104 may determine whether advertisement insertion has been triggered by either a timer or an automated analysis of the stream content. In other embodiments, new advertisement content may be requested ahead of the time that an advertisement is expected to be needed for insertion as part of a pre-fetch process.

If the computing system 104 determines to request a new advertisement, a request is sent to the advertisement service or server (not illustrated in method 300) and the responsive advertisement package is received at block 310 prior to proceeding to block 312. At decisional block 312, the computing system 104 may determine whether to insert or otherwise integrate an advertisement within the current frame being assembled by the computing system 104 for upload to the streaming platform. In some embodiments, displaying the advertisement may mean continuing display of an advertisement previously included in the prior frame. For example, the advertisement package and/or code of the advertisement plug-in may indicate a length of time (such as fifteen seconds) that a given advertisement should remain in the stream. If the computing system 104 determines not to insert an advertisement in the current frame, the method proceeds to block 316 to upload the current frame to the streaming platform. If the computing system 104 instead determines at block 312 to incorporate an advertisement in the current frame, the method proceeds to block 314.

At block 314, the computing system 104 may integrate the advertisement content received from the advertisement service in the current frame based on the user's earlier-selected layout, the game content itself and/or computer-executable instructions within the advertisement package, as described above. The current frame is added to the outgoing video stream sent to the streaming platform at block 316 as part of the continuous upload of final stream content. If the computing system 104 determines that the streamer desires to stop streaming (such as by selecting a user interface element), the method ends. Otherwise, the method loops back to block 306 for processing and assembling the next frame of the stream.

Figure 4:
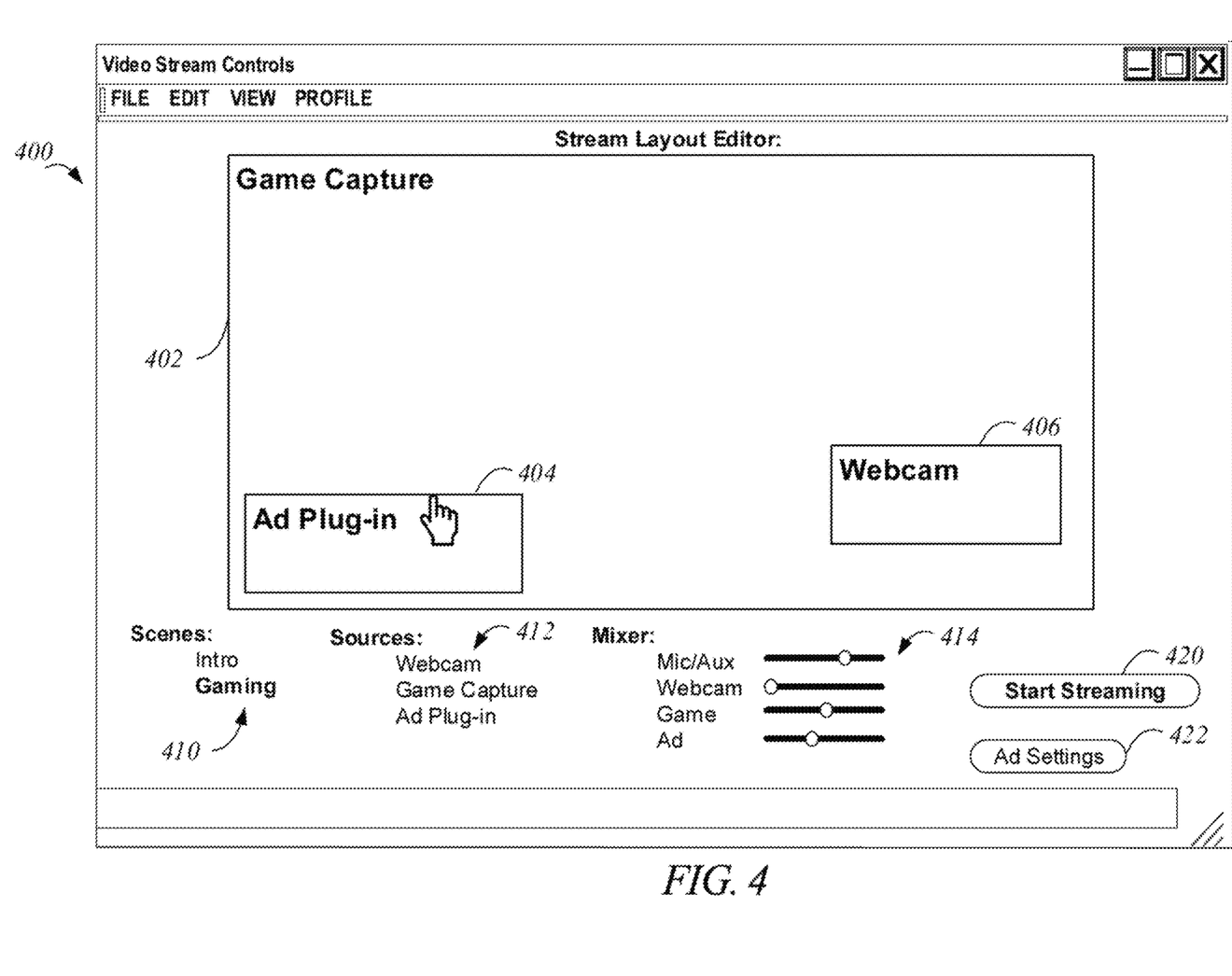
FIG. 4 is an illustrative user interface that enables a user to arrange a layout for the production of streaming video content, including advertisements or other supplemental overlay content, to be received from multiple sources and uploaded to a streaming service or platform.

FIG. 4 is an illustrative user interface 400 that enables a user to arrange a layout for the production of streaming video content, including advertisements or other supplemental overlay content, to be received from multiple sources and uploaded to a streaming service or platform. As illustrated, the user interface includes a layout editor view in which the user may drag (e.g., using a cursor or touchscreen) visual bounding boxes that represent different video or graphical inputs or assets in order to arrange the user's desired visual layout for a given stream.

The displayed editor includes bounding box 402 representing captured video output from a video game, a bounding box 404 representing a space for advertisement content, and bounding box 406 for video input from a video camera. In some embodiments, a user may move individual bounding boxes, resize them, set their opacity, add framing effects, and/or various other visual options. The user may set up different scenes 410 that may serve as shortcuts for rearranging the layout or changing the video sources at certain points during a stream. The user may select among sources 412 to change settings for the various inputs (e.g., the video camera, the game platform, the advertisement functionality, etc.), and may adjust relative audio levels of the audio inputs via mixer controls 414.

When the user is ready to start live streaming to a streaming platform, the user may select option 420. If the user selects ad settings option 422, the computing system 104 may present a user interface with various options for the user the indicate what advertisements he is interested in including in his stream (e.g., specific advertisement formats like static graphics or animated advertisements, specific sponsors allowed or not allowed, etc.). Options may additionally be available regarding when or how the advertisements should be displayed (e.g., a timing schedule, an indication of specific points in the game when advertisements should or should not be shown, etc.). In some embodiments, the user may adjust these settings at any time during a live stream.

Figure 5:
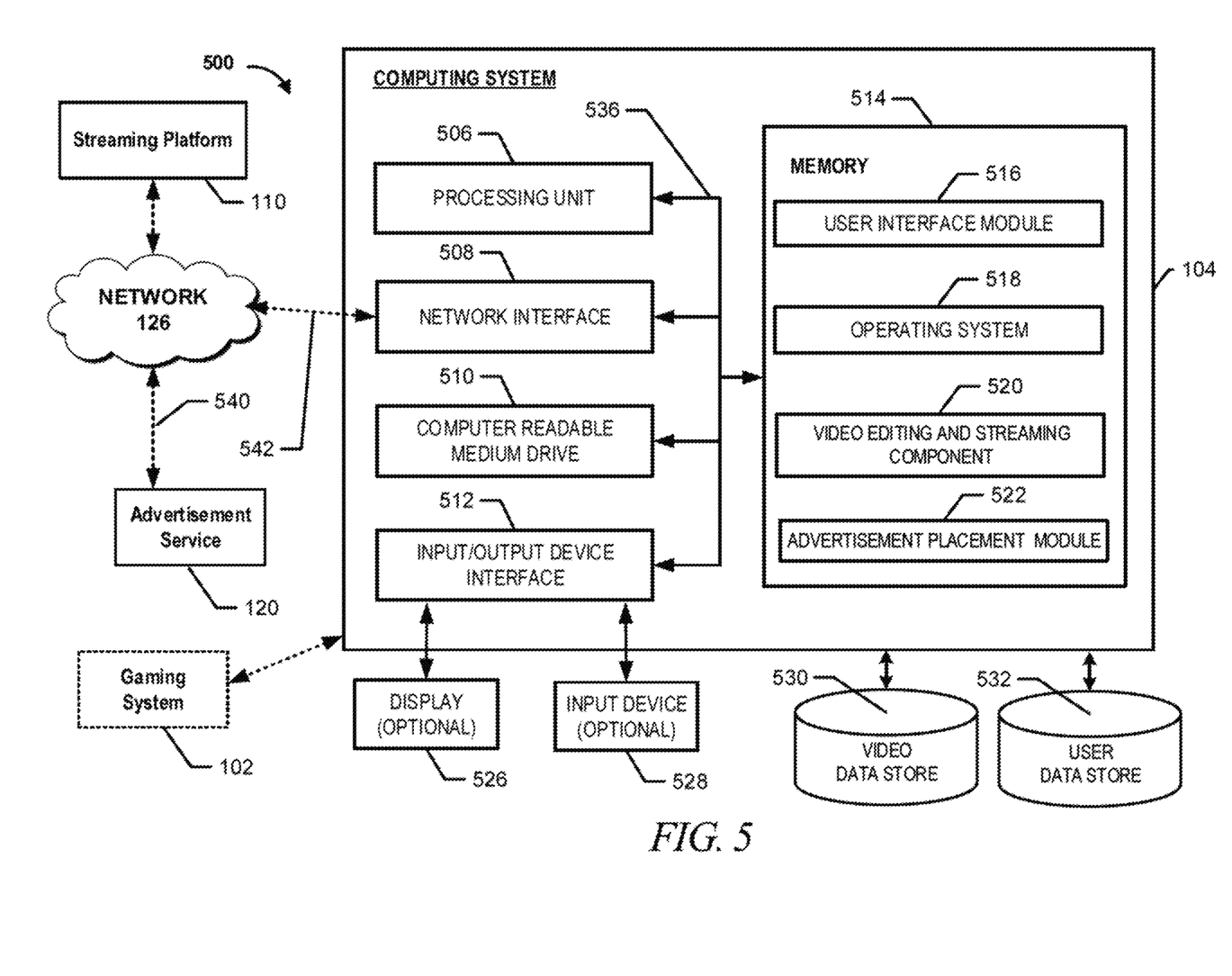
FIG. 5 is a system block diagram of a computing environment suitable for use in various embodiments of the present disclosure.

FIG. 5 illustrates a general architecture of a computing environment 500, according to some embodiments. As depicted in FIG. 5, the computing environment 500 may include a computing system 104. The general architecture of the computing system 104 may include an arrangement of computer hardware and software components used to implement aspects of the present disclosure. The computing system 104 may include many more (or fewer) elements than those shown in FIG. 5. It is not necessary, however, that all of these generally conventional elements be shown in order to provide an enabling disclosure.

As illustrated, the computing system 104 includes a processing unit 506, a network interface 508, a computer readable medium drive 510, an input/output device interface 512, a display 526, and an input device 528, all of which may communicate with one another by way of a communication bus 336. The processing unit 506 may communicate to and from memory 514 and may provide output information for the display 326 via the input/output device interface 512. The input/output device interface 512 may also accept input from the input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 104. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on the computing system 104.

In some embodiments, the memory 514 may include a video editing and streaming component 520 and advertisement placement module 522, which may be executed by the processing unit 506 to perform operations according to various embodiments described herein. The modules 520 and/or 522 may access the video data store 530 and/or user data store 532 in order to retrieve data described above and/or store data. The data stores may be part of the computing system 104, remote from the computing system 104, and/or may be network-based services.

In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with a streaming platform 110 and advertisement service 120 via the network 126, such as the Internet. In particular, the computing system 104 may establish a communication link 542 with a network 126 (e.g., using known protocols) in order to send communications to the over the network. Similarly, the streaming platform and advertisement service may send communications to the computing system 104 over the network 126 via wired or wireless communication links, such as link 540. The advertisement service 120 may include similar hardware to that illustrated as being included in computing system 104, such as a processing unit, network interface, memory, operating system, etc.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:
   memory; and
   a processor in communication with the memory and configured with processor-executable instructions to perform operations comprising:
      obtaining, at a client device via local communication, underlying video content in real time as the underlying video content is first generated or first captured;
      sending a request, over a network, for advertisement data from an advertisement service, wherein the request for the advertisement data includes information regarding at least one of (a) a user of the client device, (b) a streaming platform to which the underlying video content is being uploaded from the client device, or (c) subject matter of the underlying video content, wherein the advertisement service is separate from the streaming platform;
      receiving, from the advertisement service based on the request, advertisement content to be integrated into at least a subset of frames of the underlying video content at the client device prior to the client device sending the subset of frames to the streaming platform and prior to streaming of the subset of frames to any remotely located computing devices;
      assembling, at the client device, at least one modified frame that includes (1) at least a portion of a frame of the subset of frames of the underlying video content and (2) the advertisement content integrated within the portion of the frame; and
      sending, over the network in real time as frames of the underlying video content continue to be received at the client device, at least the modified frame to the streaming platform, wherein the streaming platform is configured to broadcast the modified frame to a plurality of remotely located computing devices as part of an ongoing live video stream.

2. The computer system of claim 1, wherein the advertisement content is selected based at least in part on real time viewership data from the streaming platform.

3. The computer system of claim 1, wherein the operations further comprise rendering the advertisement content to appear to be part of a three-dimensional scene depicted in the underlying video content.

4. The computer system of claim 1, wherein the underlying video content comprises video captured by a camera in local communication with the client device.

5. Three computer system of claim 1, wherein the underlying video content comprises video output generated by code of a video game played by a user of the client device.

6. The computer system of claim 5, wherein the video game is played on one of a video game console system, a mobile gaming device, a smartphone, a laptop computer, or a desktop computer.

7. The computer system of claim 5, wherein the computer system executes the code of the video game to generate the video output.

8. The computer system of claim 5, wherein the code of the video game is executed by a gaming system that is separate from the computer system, wherein the computer system is configured to receive the video output from the gaming system.

9. The computer system of claim 1, wherein the advertisement service is configured to conduct a real time auction of advertisement inventory to select the advertisement content based at least in part on the information in the request for the advertisement data.

10. A computer-implemented method comprising:
obtaining, at a client device via local communication, underlying video content in real time as the underlying video content is first generated or first captured;
sending a request, over a network, for advertisement data from an advertisement service, wherein the request for the advertisement data includes information regarding at least one of (a) a user of the client device, (b) a streaming platform to which the underlying video content is being uploaded from the client device, or (c) subject matter of the underlying video content, wherein the advertisement service is separate from the streaming platform;
receiving, from the advertisement service based on the request, advertisement content to be integrated into at least a subset of frames of the underlying video content at the client device prior to the client device sending the subset of frames to the streaming platform and prior to streaming of the subset of frames to any remotely located computing devices;
assembling, at the client device, at least one modified frame that includes (1) at least a portion of a frame of the subset of frames of the underlying video content and (2) the advertisement content integrated within the portion of the frame; and
sending, over the network in real time as frames of the underlying video content continue to be received at the client device, at least the modified frame to the streaming platform, wherein the streaming platform is configured to broadcast the modified frame to a plurality of remotely located computing devices as part of an ongoing live video stream.

11. The computer-implemented method of claim 10, wherein the underlying video content comprises at least one of: (a) video captured by a camera that is in local communication with the client device or (b) video output generated by code of a video game.

12. The computer-implemented method of claim 10, wherein the underlying video content comprises both (a) video of a person as captured by a camera and (b) video output generated by code of a video game played by the person.

13. The computer-implemented method of claim 12 further comprising generating a user interface that enables a user to visually arrange respective locations within modified frames at which to visually incorporate each of a plurality of inputs, wherein the inputs include at least (a) the advertisement content, (b) the video captured by the camera, and (c) the video output generated by the code of the video game.

14. The computer-implemented method of claim 13, wherein enabling the user to visually arrange the respective locations comprises presenting a layout editor view within the user interface that provides functionality for the user to move displayed locations of any of a plurality visual bounding boxes that each represent a different input of the plurality of inputs.

15. The computer-implemented method of claim 10, wherein the underlying video content comprises video output generated by code of a video game, wherein the computer-implemented method further comprises rendering the advertisement content using augmented reality (AR) techniques such that the advertisement content as rendered appears to be incorporated within a virtual three-dimensional environment of the video game.

16. The computer-implemented method of claim 15, wherein the virtual three-dimensional environment is rendered as two-dimensional video output by the code of the video game, wherein the advertisement content is rendered using the augmented reality techniques as applied to the two-dimensional video output without accessing any code of the video game.

17. Non-transitory computer readable media including computer-executable instructions that, when executed by a computing system, cause the computing system to perform operations comprising:
obtaining, at a client device via local communication, underlying video content in real time as the underlying video content is first generated or first captured;
sending a request, over a network, for advertisement data from an advertisement service, wherein the request for the advertisement data includes information regarding at least one of (a) a user of the client device, (b) a streaming platform to which the underlying video content is being uploaded from the client device, or (c) subject matter of the underlying video content, wherein the advertisement service is separate from the streaming platform;
receiving, from the advertisement service based on the request, advertisement content to be integrated into at least a subset of frames of the underlying video content at the client device prior to the client device sending the subset of frames to the streaming platform and prior to streaming of the subset of frames to any remotely located computing devices;
generated, at the client device, at least one modified frame that includes (1) at least a portion of a frame of the subset of frames of the underlying video content and (2) the advertisement content integrated within the portion of the frame; and
sending, over the network, at least the modified frame to the streaming platform, wherein the streaming platform is configured to broadcast the modified frame to a plurality of remotely located computing devices.

18. The non-transitory computer readable media of claim 17, wherein the underlying video content comprises video output generated by code of a video game.

19. The non-transitory computer readable media of claim 18, wherein the operations further comprise selecting the advertisement content based at least in part on detection that a particular in-game occurrence has occurred within the video game.

20. The non-transitory computer readable media of claim 17, wherein the advertisement content is selected based at least in part on information regarding at least a subset of a plurality of users viewing a live streaming broadcast of the underlying video content as streamed via the streaming platform.

\* \* \* \* \*